United States Patent
Hiroyuki

(10) Patent No.: US 12,467,948 B2
(45) Date of Patent: Nov. 11, 2025

(54) CONTACT PROBE

(71) Applicant: Enplas Corporation, Kawaguchi (JP)

(72) Inventor: Ichikawa Hiroyuki, Kawaguchi (JP)

(73) Assignee: Enplas Corporation, Kawaguchi (JP)

( * ) Notice: Subject to any disclaimer, the term of this patent is extended or adjusted under 35 U.S.C. 154(b) by 141 days.

(21) Appl. No.: 18/517,424

(22) Filed: Nov. 22, 2023

(65) Prior Publication Data

US 2024/0175899 A1 May 30, 2024

(30) Foreign Application Priority Data

Nov. 28, 2022 (CN) .......................... 202211503557.8

(51) Int. Cl.
*G01R 31/20* (2006.01)
*G01R 1/067* (2006.01)

(52) U.S. Cl.
CPC ..... *G01R 1/06744* (2013.01); *G01R 1/06716* (2013.01)

(58) Field of Classification Search
CPC ............ G01R 31/2889; G01R 31/2808; G01R 31/2886; G01R 31/2831; G01R 31/2648; G01R 31/2884; G01R 31/2887; G01R 1/06716; G01R 1/06722; G01R 1/06744; G01R 1/06788; G01R 1/0433; G01R 1/0466; G01R 1/0483; G01R 1/07342; G01R 1/07378; G01R 1/07314; G01R 1/07371

See application file for complete search history.

(56) References Cited

U.S. PATENT DOCUMENTS

| | | | |
|---|---|---|---|
| 11,841,380 B2* | 12/2023 | Yuta .................... | G01R 1/06722 |
| 2010/0285698 A1* | 11/2010 | Lee ...................... | G01R 1/06722 |
| | | | 439/786 |
| 2015/0070040 A1* | 3/2015 | Treibergs ............ | G01R 1/06705 |
| | | | 29/826 |
| 2018/0335447 A1* | 11/2018 | Yamamoto ............. | G01R 31/26 |
| 2024/0044939 A1* | 2/2024 | Wu ..................... | G01R 1/06722 |
| 2024/0094251 A1* | 3/2024 | Oh ........................ | G01R 1/0466 |

* cited by examiner

*Primary Examiner* — Thang X Le
(74) *Attorney, Agent, or Firm* — RANKIN, HILL & CLARK LLP; Erik J. Overberger

(57) ABSTRACT

An embodiment of the present application provides a contact probe, which comprises a tubular structure, an engagement part, a pushing part and an elastic member. The elastic member is received within the tubular structure; the engagement part is arranged within the tubular structure; the pushing part is arranged within the tubular structure and is arranged at the inner wall of the tubular structure opposite to the engagement part; a part of the elastic member is arranged in the tubular structure, and a side surface at a first end of the elastic member is engaged with the engagement part, and the pushing part presses a side surface of the elastic member facing the pushing part, and both the engagement part and the pushing part press the elastic member to make the elastic member in a bent state, and make a part of the elastic member in the tubular structure to abut closely against the inner wall of the tubular structure. In the present embodiment, when using the contact probe, the elastic member can always bend in one direction and contact with a same part of the inner wall of the tubular structure, which can improve the stability of the structures within the contact probe, so as to improve the stability of electrical testing.

10 Claims, 11 Drawing Sheets

CONTACT PROBE

TECHNICAL FIELD

The present application relates to the field of electrical testing, specifically to a contact probe.

BACKGROUND

In the production process of electrical components, such as IC (Integrated Circuit) packages, it is necessary to use a relevant test device to test the electrical performance thereof. Such a test device generally includes a socket electrically connected to another electrical component (such as a wiring substrate).

A socket in the related art includes a socket cylinder and a contact probe, wherein a receiving part for receiving a first electrical component is formed on the socket cylinder, and a probe receiving hole is also formed on the socket cylinder, and the contact probe is received in the probe receiving hole. In the process of electrical testing, the first electrical component is placed in the receiving part, one end of the contact probe contacts with the terminal of the first electrical component, and the other end of the contact probe contacts with another electrical component (hereinafter referred to as a second electrical component), thus establishing an electrical connection between the first electrical component and the second electrical component.

In order to ensure the accuracy of the electrical test results, the resistance value of the contact probe is not allowed to exceed an allowable resistance value. According to the different loads applied to the second component by the contact probe during operation (hereinafter referred to as loads), the contact probe can be divided into various types. The inventors of this disclosure found that the resistance value of the contact probe of a type with a relatively small load will increase with the increase of the number of electrical tests. This means that with the increase of the number of electrical tests, the resistance value of the contact probe of the type with a relatively small load will frequently exceed the allowable resistance value, which will adversely affect the accuracy of the electrical test results, thus worsening the reliability of the electrical test.

SUMMARY

The embodiment of the present application provides a contact probe to improve the reliability of electrical test.

The embodiment of the present application provides a contact probe, which comprises a tubular structure, an engagement part, a pushing part and an elastic member. The elastic member is received within the tubular structure; the engagement part is arranged within the tubular structure; the pushing part is arranged within the tubular structure and is arranged at an inner wall of the tubular structure opposite to the engagement part; a part of the elastic member is arranged in the tubular structure, and a side surface at a first end of the elastic member is engaged with the engagement part, and the pushing part presses a side surface of the elastic member facing the pushing part, and both the engagement part and the pushing part press the elastic member to make the elastic member in a bent state, and make a part of the elastic member in the tubular structure to abut closely against the inner wall of the tubular structure.

According to the contact probe in the embodiment of the present application, the engagement part and the pushing part are simultaneously arranged on the inner wall of the tubular structure, and the engagement part and the pushing part are oppositely arranged at two sides of the inner wall of the tubular structure. When the elastic member is assembled within the tubular structure, the side surface at the first end of the elastic member is engaged with the engagement part, and the pushing part presses a side surface of the elastic member facing the pushing part, so that the elastic member can be in a bent state under the pressing of both the engagement part and the pushing part. At this time, the elastic member will abut closely against the inner wall of the tubular structure. In the present embodiment, when the elastic member is installed within the tubular structure, firstly, the elastic member is bent in advance through the joint action of the engagement part and the pushing part, so that the elastic member always bends in one direction when it is bent, and when using the contact probe, the elastic member can always bend in one direction and contact with a same part of the inner wall of the tubular structure, which can improve the stability of the structures within the contact probe, so as to improve the stability of electrical testing.

In some embodiments of the present application, the elastic member comprises tight coil parts at two ends thereof and a loose coil part arranged between the tight coil parts;

the engagement part is engaged with the tight coil part at the first end of the elastic member, and the tight coil part at a second end of the elastic member protrudes out of the tubular structure;

when the elastic member is not compressed, the loose coil part abuts against the inner wall of the tubular structure, and when the elastic member is compressed, a part of the tight coil part protruding out of the tubular structure abuts closely against the inner wall of the tubular structure.

In some embodiments of the present application, the engagement part is clamped into a coil of the tight coil part, and the pushing part presses a side surface of the tight coil part facing the pushing part to make the elastic member in a bent state.

In some embodiments of the present application, the engagement part and the pushing part are integrally formed with the tubular structure.

In some embodiments of the present application, a tube wall of the tubular structure is provided with a first cutting groove, and a part of the tube wall of the tubular structure extends into a receiving cavity along the first cutting groove to form the engagement part.

In some embodiments of the present application, the tube wall of the tubular structure is provided with a second cutting groove, and a part of the tube wall of the tubular structure extends into the receiving cavity along the second cutting groove to form the pushing part.

In some embodiments of the present application, the contact probe further comprises a blocking part, which is arranged within the receiving cavity and fixedly connected to the tubular structure, and an end face at the first end of the elastic member abuts against the blocking part.

In some embodiments of the present application, the blocking part is integrally formed with the tubular structure.

In some embodiments of the present application, the tube wall of the tubular structure is provided with a third cutting groove, and a part of the tube wall of the tubular structure extends into the receiving cavity along the third cutting groove to form the blocking part.

In some embodiments of the present application, an outer wall of the tubular structure is provided with at least one protrusion.

BRIEF DESCRIPTION OF THE DRAWINGS

In order to explain the technical solutions in the embodiments of the present application or related art more clearly, the drawings required in the description of the embodiments of the present application or related art will be briefly introduced below. Obviously, the drawings in the following description are only some embodiments of the present application. Other drawings can be obtained by those ordinary skilled in the art according to these drawings without creative effort.

DETAILED DESCRIPTION

The technical solutions of the embodiments of the present application will be below clearly and completely described with reference to the drawings of the embodiments of the present application. Obviously, the described embodiments are only parts of the embodiments of the present application instead of all embodiments. Based on the embodiments in the present application, all other embodiments obtained by ordinary skilled in the art based on the present application belong to the protection scope of the present application.

Figure 1:
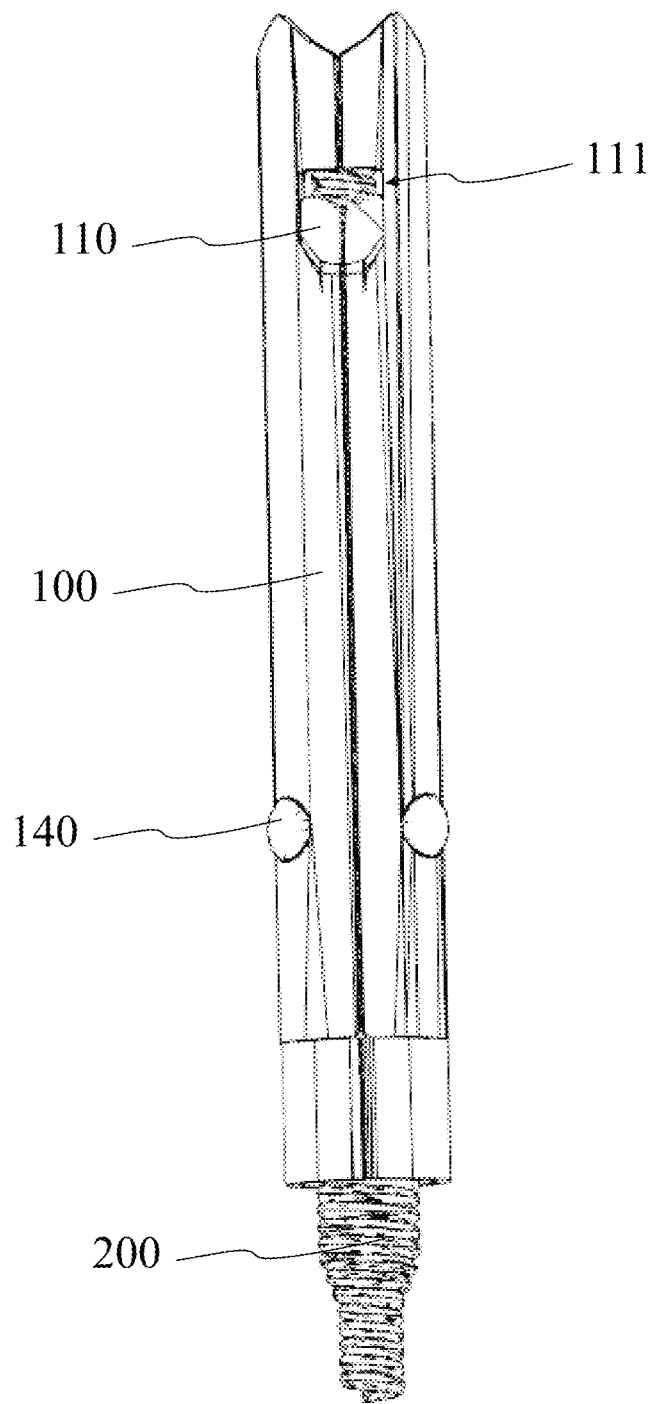
FIG. 1 is a structural schematic diagram of a contact probe in an embodiment of the present application.
Figure 2:
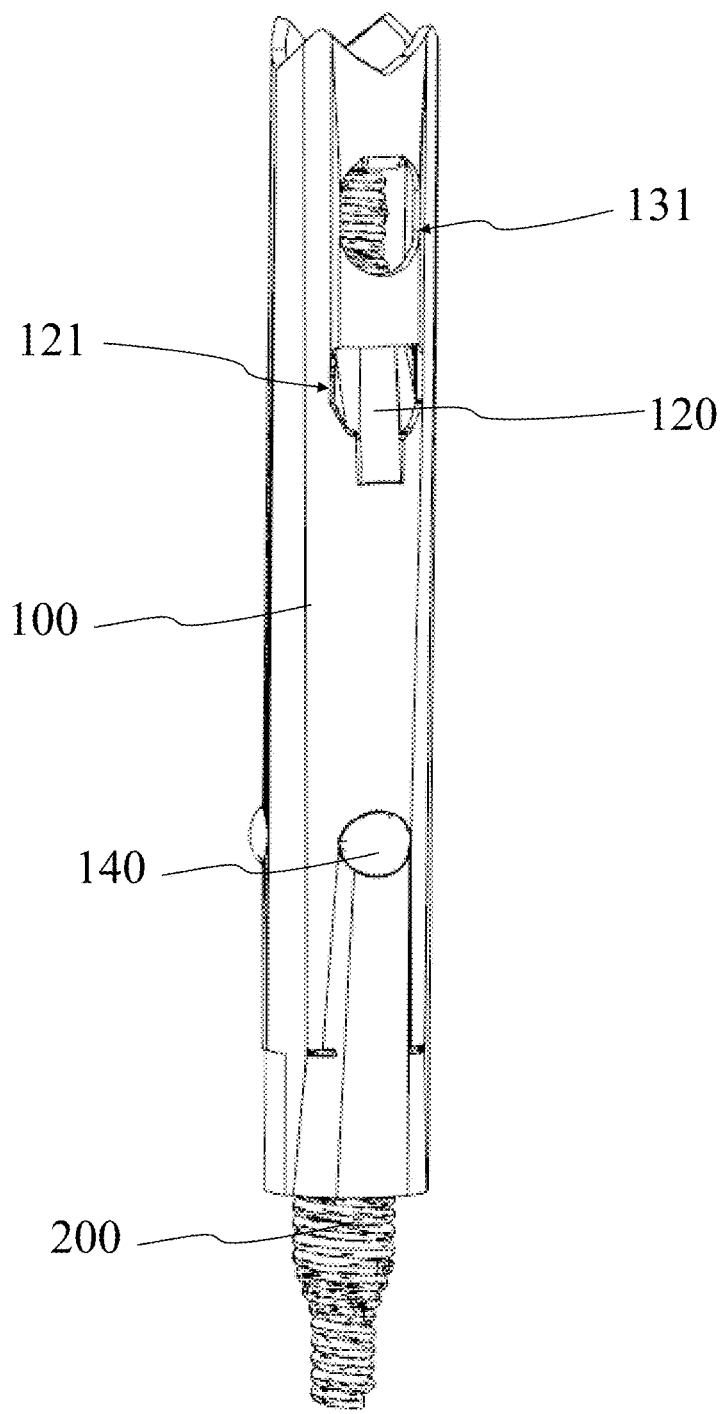
FIG. 2 is a schematic structural diagram of the contact probe shown in FIG. 1 from another perspective.
Figure 3:
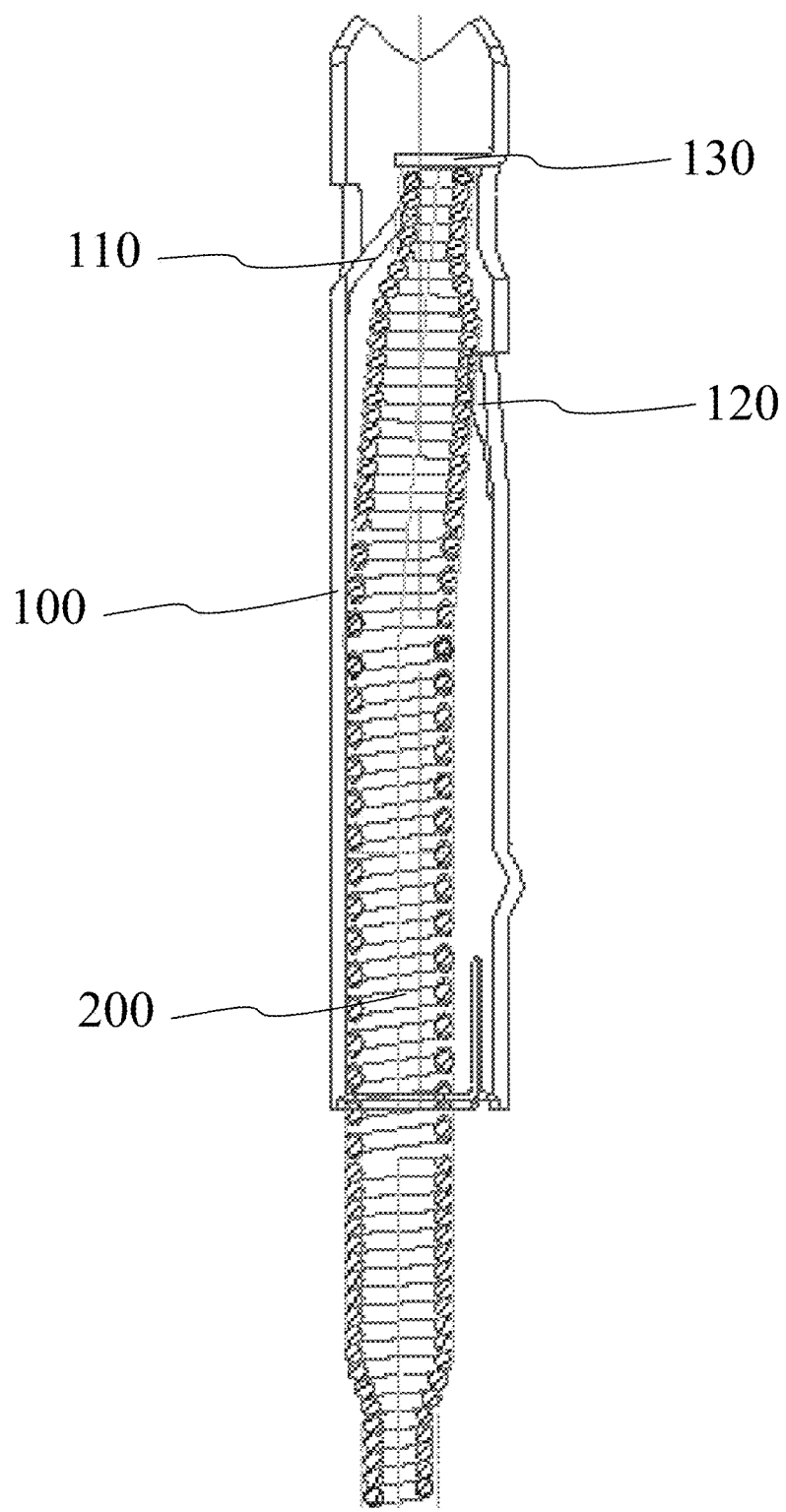
FIG. 3 is a cross-sectional view of the contact probe shown in FIG. 1.

As shown in FIGS. 1 to 3, an embodiment of the present application provides a contact probe, which comprises a tubular structure 100, an engagement part 110, a pushing part 120 and an elastic member 200. The elastic member 200 is received within the tubular structure 100; the engagement part 110 is arranged within the tubular structure 100; the pushing part 120 is arranged within the tubular structure 100 and is arranged at the inner wall of the tubular structure 100 opposite to the engagement part 110; a part of the elastic member 200 is arranged within the tubular structure 100, and a side surface at a first end of the elastic member 200 is engaged with the engagement part 110, and the pushing part 120 presses a side surface of the elastic member 200 facing the pushing part, and both the engagement part 110 and the pushing part 120 press the elastic member 200 to make the elastic member 200 in a bent state, and make a part of the elastic member 200 within the tubular structure 100 to abut closely against the inner wall of the tubular structure 100.

According to the contact probe in the embodiment of the present application, the engagement part 110 and the pushing part 120 are simultaneously arranged on the inner wall of the tubular structure 100, and the engagement part 110 and the pushing part 120 are oppositely arranged at two sides of the inner wall of the tubular structure 100. When the elastic member 200 is assembled within the tubular structure 100, the side surface at the first end of the elastic member 200 is engaged with the engagement part 110, and the pushing part 120 presses the side surface of the elastic member 200 facing the pushing part, so that the elastic member 200 can be in a bent state under the pressing of both the engagement part 110 and the pushing part 120. At this time, the elastic member 200 will abut closely against the inner wall of the tubular structure 100. In the present embodiment, when the elastic member 200 is installed within the tubular structure 100, firstly, the elastic member 200 is bent in advance through the joint action of the engagement part 110 and the pushing part 120, so that the elastic member 200 always bends in one direction when it is bent, and when using the contact probe, the elastic member 200 can always bend in one direction and contact with a same part of the inner wall of the tubular structure 100, which can improve the stability of the structures within the contact probe, so as to improve the stability of electrical testing.

Figure 4:
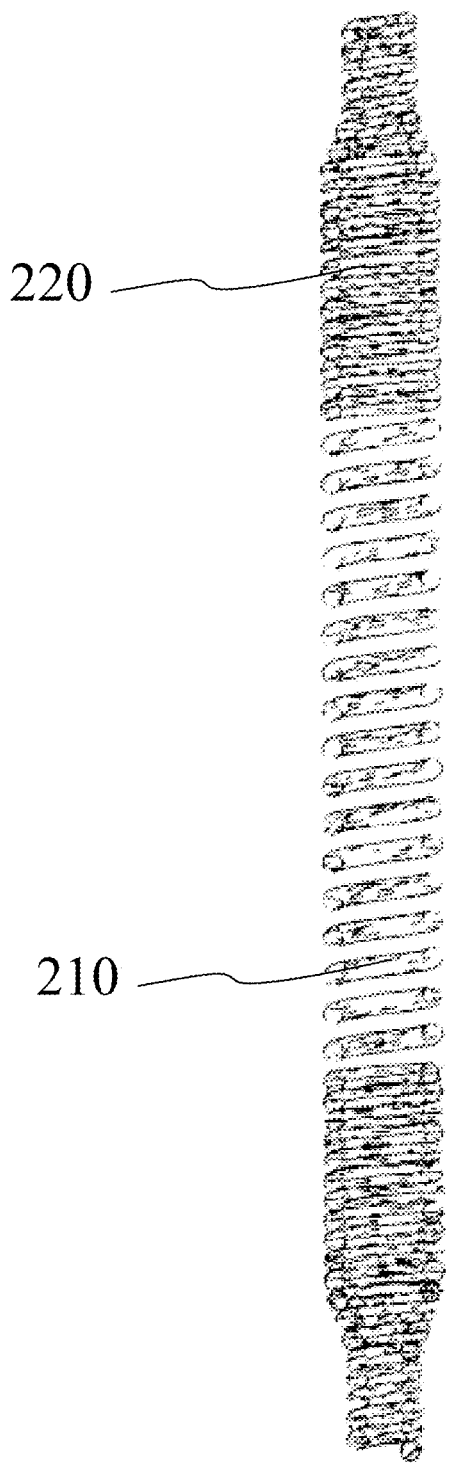
FIG. 4 is a schematic structural diagram of the elastic member of the contact probe in an embodiment of the present application.

As shown in FIG. 4, in some embodiments of the present application, the elastic member 200 includes tight coil parts 220 at two ends thereof and a loose coil part 210 arranged between the tight coil parts 220; the engagement part 110 is engaged with the tight coil part 220 at the first end of the elastic member 200, and the tight coil part 220 at the second end of the elastic member 200 protrudes out of the tubular structure 100. When the elastic member 200 is not compressed, the loose coil part 210 abuts against the inner wall of the tubular structure 100, and when the elastic member 200 is compressed, the part of the tight coil part 220 protruding out of the tubular structure 100 abuts closely against the inner wall of the tubular structure 100. In the present embodiment, the elastic member 200 includes two parts, i.e., the tight coil parts arranged at two ends, and the middle part being the loose coil part. In addition, the loose coil part of the elastic member 200 is located within the tubular structure 100, while the tight coil part at one end is engaged with the engagement part 110 of the tubular structure 100, and the tight coil part at the other end protrudes out of the tubular structure 100. It can be understood that the loose coil part is always located within the tubular structure 100 when using the contact probe, so that the elastic member can always contact with the inner wall at the same side of the tubular structure 100, and a detection error caused by the elastic member shaking back and forth can be avoided.

Figure 5:
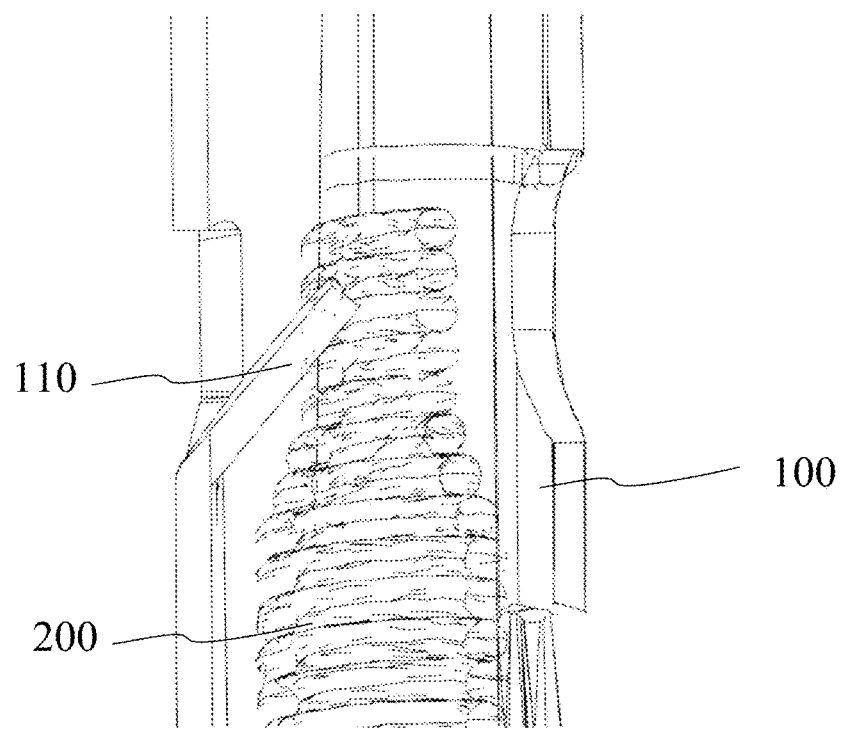
FIG. 5 is a partial enlarged view of the contact probe shown in FIG. 1.

As shown in FIG. 5, in some embodiments of the present application, the engagement part 110 is clamped into a coil of the tight coil part 220, and the pushing part 120 presses a side surface of the tight coil part 220 facing the pushing part to make the elastic member 200 in a bent state. In the present embodiment, when the elastic member 200 is mounted to the tubular structure 100, the tight coil part of the elastic member 200 can be clamped into the coil of the tight coil part, so that the elastic member 200 can be firmly fixed to the tubular structure 100. At this time, the pushing part 120 presses a side surface of the tight coil part facing the pushing part to bend the elastic member 200 to one side, so that the elastic member 200 can bend in one direction, which can improve the stability of the structures within the contact probe.

Figure 6:
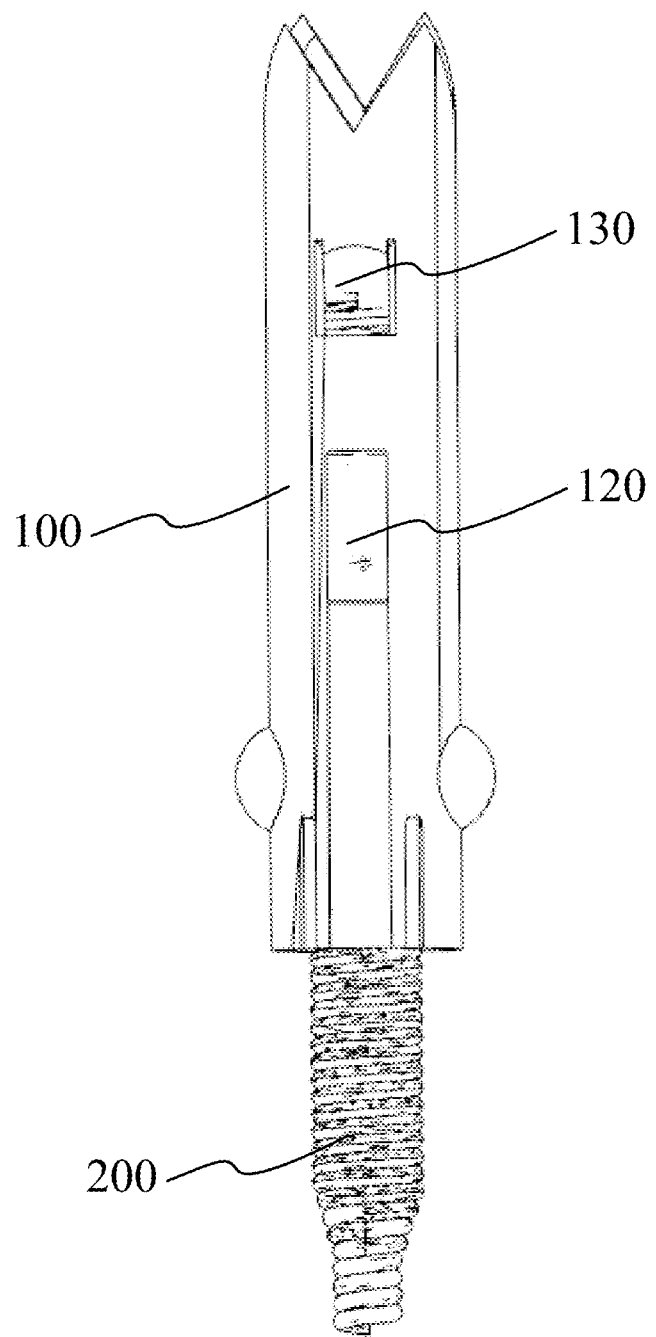
FIG. 6 is another structural schematic diagram of the contact probe in an embodiment of the present application.
Figure 7:
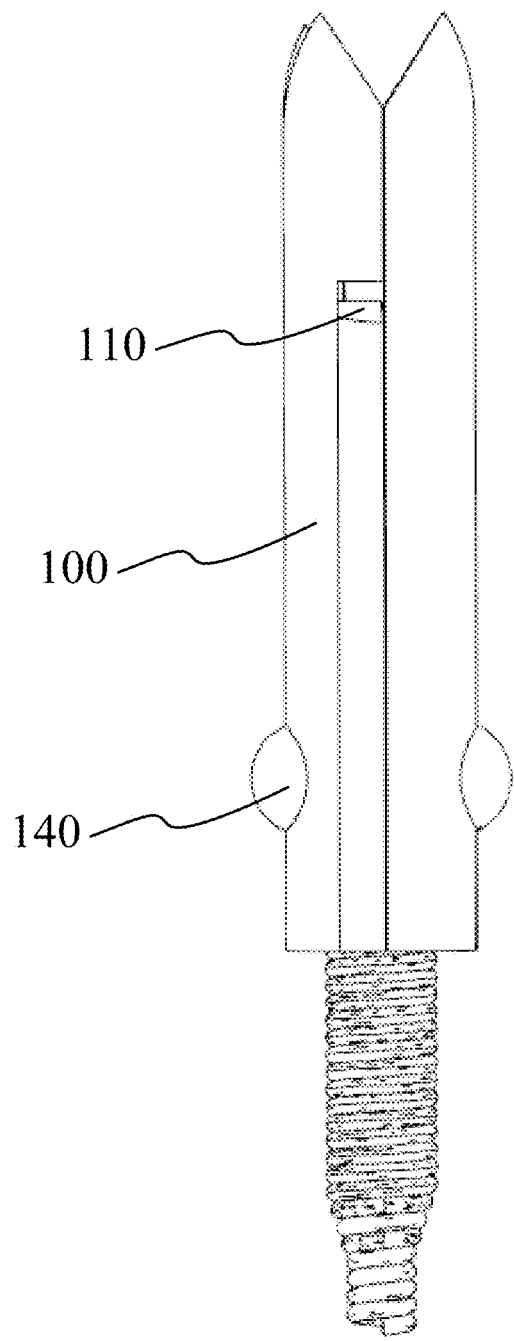
FIG. 7 is a schematic structural diagram of the contact probe shown in FIG. 6 from another perspective.

As shown in FIGS. 6 and 7, in some embodiments of the present application, the engagement part 110 and the pushing part 120 are integrally formed with the tubular structure 100. In the present embodiment, the engagement part 110 and the pushing part 120 can be integrally formed with the tubular structure 100. Compared with fixing the engagement part 110 or the pushing part 120 on the inner wall of the tubular structure 100 in other ways, the integral formation in the present embodiment can improve the structural stability of the tubular structure 100 and the engagement part 110 or the pushing part 120.

In some embodiments of the present application, a tube wall of the tubular structure 100 is provided with a first cutting groove 111, and a part of the tube wall of the tubular structure 100 extends into the receiving cavity along the first cutting groove 111 to form the engagement part 110. In the present embodiment, the tube wall of the tubular structure 100 is provided with the first cutting groove 111, thus the part of the tube wall of the tubular structure 100 provided with the first cutting groove 111 can be pressed toward the inside of the tubular structure 100 to form the engagement part 110. In the present embodiment, the tubular structure 100 and the engagement part 110 provided within the tubular structure 100 are integrally formed, which can save the cost.

In some embodiments of the present application, the tube wall of the tubular structure 100 is provided with a second cutting groove 121, and a part of the tube wall of the tubular structure 100 extends into the receiving cavity along the second cutting groove 121 to form the pushing part 120. In the present embodiment, the tube wall of the tubular structure 100 is also provided with the second cutting groove 121, thus the part of the tube wall of the tubular structure 100 provided with the second cutting groove 121 can be pressed toward the inside of the tubular structure 100 to form the pushing part 120. In the present embodiment, the tubular structure 100 and the pushing part 120 provided within the tubular structure 100 are integrally formed, which can save the cost.

Figure 8:
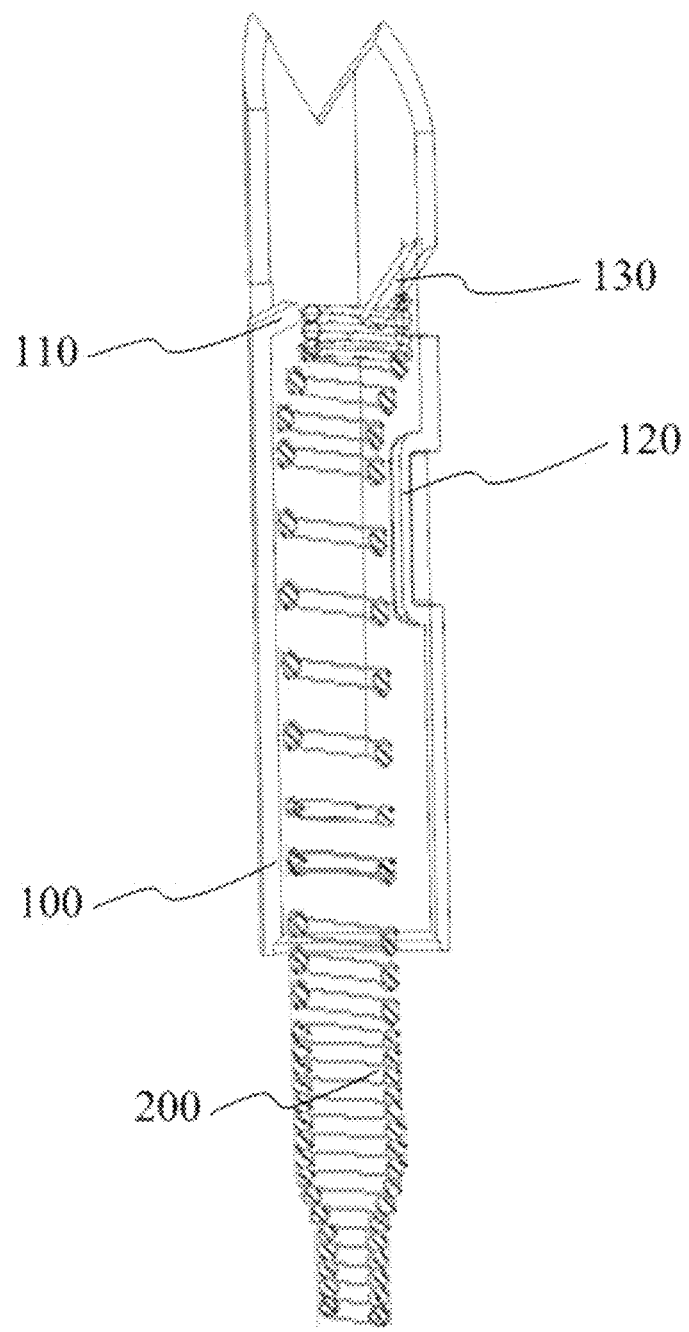
FIG. 8 is a cross-sectional view of a contact probe in an embodiment of the present application.

As shown in FIG. 8, in some embodiments of the present application, the contact probe further comprises a blocking part 130, which is arranged within the receiving cavity and fixedly connected to the tubular structure 100, and an end face at the first end of the elastic member 200 abuts against the blocking part 130. In the present embodiment, the blocking part 130 is further formed within the tubular structure 100. When the elastic member 200 is installed within the tubular structure 100, the end face at the first end of the elastic member 200 abuts against the blocking part 130. By providing the blocking part 130, the stability of the elastic member 200 within the tubular structure 100 can be improved.

In some embodiments of the present application, the blocking part 130 is integrally formed with the tubular structure 100. In the present embodiment, the blocking part 130 can be integrally formed with the tubular structure 100. Compared with fixing the blocking part 130 on the inner wall of the tubular structure 100 in other ways, the integral formation in the present embodiment can improve the structural stability of the tubular structure 100 and the blocking part 130.

In some embodiments of the present application, the tube wall of the tubular structure 100 is provided with a third cutting groove 131, and a part of the tube wall of the tubular structure 100 extends into the receiving cavity along the third cutting groove 131 to form the blocking part 130. In the present embodiment, the tube wall of the tubular structure 100 is also provided with the third cutting groove 131, thus the part of the tube wall of the tubular structure 100 provided with the third cutting groove 131 can be pressed toward the inside of the tubular structure 100 to form the blocking part 130. In the present embodiment, the tubular structure 100 and the blocking part 130 provided within the tubular structure 100 are integrally formed, which can save the cost.

In some embodiments of the present application, an outer wall of the tubular structure 100 is provided with at least one protrusion 140. In the present embodiment, a plurality of protrusions are formed on the outer wall of the tubular structure 100, which can play a role in anti-slip.

In some embodiments of the present application, the contact probe comprises a tubular structure 100, an engagement part 110 and an elastic member 200. The elastic member 200 is received within the tubular structure 100; the engagement part 110 is arranged within the tubular structure 100; a part of the elastic member 200 is arranged within the tubular structure 100, and a first end of the elastic member 200 is engaged with the engagement part 110. The elastic member 200 abuts closely against an inner wall of the tubular structure 100, and a part of the tubular structure 100 abutting against the elastic member 200 has at least two contact surfaces 300.

In the present embodiments, the elastic member 200 is arranged within the tubular structure 100. During installation, the first end of the elastic member 200 is engaged with the engagement part 110 of the tubular structure 100. At this time, the elastic member 200 abuts closely against the inner wall of the tubular structure 100, and a part of the tubular structure 100 abutting against the elastic member 200 has at least two contact surfaces 300. That is to say, the elastic member 200 has at least three contact points with the tubular structure 100, in which the first end of the elastic member 200 is in contact with the engagement part 110, and a side wall of the elastic member 200 has two contact surfaces 300 with the inner wall of the tubular structure 100, thus forming a stable support with at least three contact points. When using the contact probe, since the elastic member 200 has stable contact surfaces 300 with the tubular structure 100, the elastic member 200, when it is bent, can always contact with at least two contact surfaces 300 of the tubular structure 100, thereby improving the stability of the structures within the contact probe and improving the reliability of electrical testing.

In some embodiments of the present application, the number of contact surfaces 300 is two. In the present embodiment, after the first end of the elastic member 200 is engaged with the engagement part 110 of the tubular structure 100, at this time, the elastic member 200 abuts closely against the inner wall of the tubular structure 100, and the part of the tubular structure 100 abutting against the elastic member 200 has two contact surfaces 300. That is to say, there are three contact points between the elastic member 200 and tubular structure 100, in which the first end of the elastic member 200 is contacted with the engagement part 110, and the side wall of the elastic member 200 has two contact surfaces 300 with the inner wall of the tubular structure 100, thus forming a stable support with the three contact points. When using the contact probe, since the elastic member 200 has the stable contact surfaces 300 with the tubular structure 100, the elastic member 200, when it is bent, can always contact with at least two contact surfaces

300 of the tubular structure 100, thereby improving the stability of the structures within the contact probe and improving the reliability of electrical testing.

Figure 9:
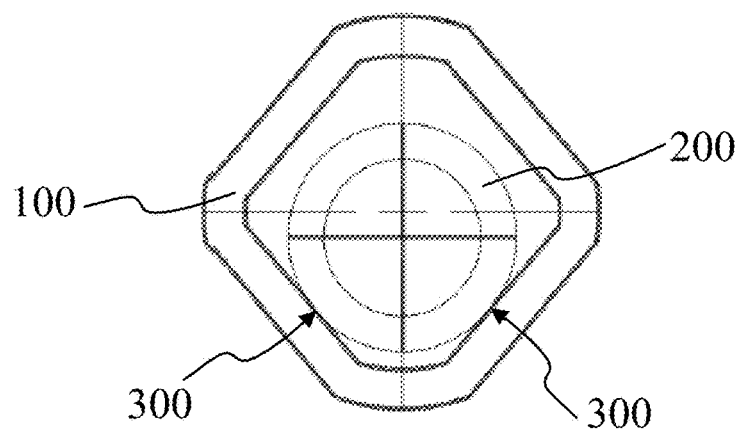
FIG. 9 is a schematic structural diagram of the cross section of the contact probe in the first embodiment of the present application.

As shown in FIG. 9, in some embodiments of the present application, the shape of the cross section of the part of the tubular structure 100 abutting against the elastic member 200 is a quasi-parallelogram, and the contact surfaces 300 are located on two adjacent sides of the quasi-parallelogram. In the present embodiment, the shape of the cross section of the tubular structure 100 can be substantially a parallelogram, and the elastic member 200 can be in contact with two adjacent sides of the parallelogram, and four corners of the parallelogram can be transitioned by arcs or chamfers, which is not particularly limited here.

Figure 10:
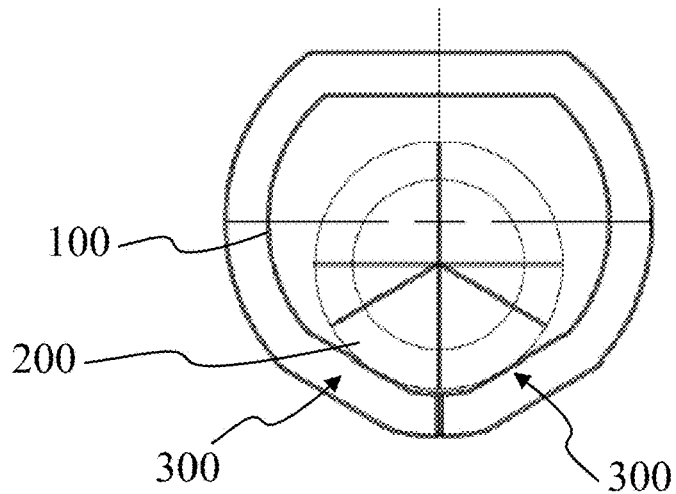
FIG. 10 is a schematic structural diagram of the cross section of the contact probe in the second embodiment of the present application.

As shown in FIG. 10, in some embodiments of the present application, the shape of the cross section of the part of the tubular structure 100 abutting against the elastic member 200 is a quasi-pentagon, which includes at least two first straight lines, and the contact surfaces 300 are located on two adjacent first straight lines. In the present embodiment, the cross section of the tubular structure 100 can also be a quasi-pentagon, which can be understood as a shape having five sides, wherein the quasi-pentagon includes at least two first straight lines, and the two contact surfaces 300 of the tubular structure 100 with the elastic member 200 are located on the two adjacent first straight lines of the quasi-pentagon. The other three sides of the quasi-pentagon can be curves or straight lines, which is not particularly limited here, and the sizes of the five sides of the quasi-pentagon are also not particularly limited.

Figure 11:
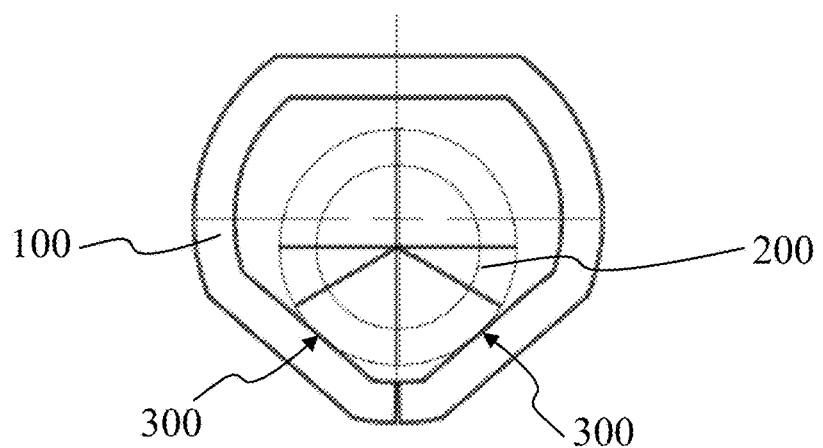
FIG. 11 is a schematic structural diagram of the cross section of the contact probe in the third embodiment of the present application.

As shown in FIG. 11, in some embodiments of the present application, the quasi-pentagon further includes one second straight line and two arcs, one end of the second straight line is connected to one of the arcs, the other end of the second straight line is connected to the other one of the arcs, and the ends of the two arcs away from the second straight line are connected to the first straight line respectively. In the present embodiment, the quasi-pentagon also has a second straight line and two arcs, wherein two ends of the second straight line are respectively connected to the two arcs, and the ends of the arcs away from the second straight line are respectively connected to the two first straight lines.

In some embodiments of the present application, the shape of the cross section of the part of the tubular structure 100 abutting against the elastic member 200 is substantially a pentagon, and the contact surfaces 300 are located on any two sides of the pentagon. In the present embodiment, the shape of the cross section of the part of the tubular structure 100 abutting against the elastic member is substantially a pentagon. In this case, all five sides of the pentagon are straight lines, and the contact surfaces 300 of the tubular structure 100 with the elastic member 200 are located on any two sides of the five sides. The five corners of the pentagon can have circular chamfers to avoid excessively sharp edges and corners.

Figure 12:
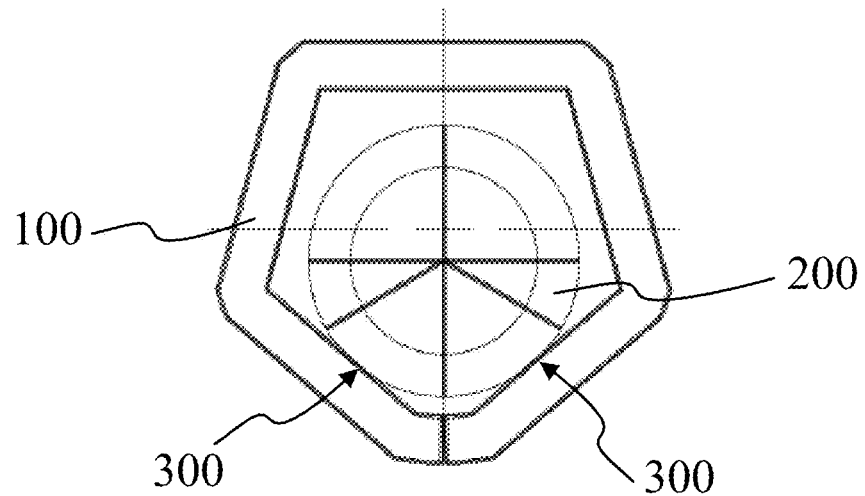
FIG. 12 is a schematic structural diagram of the cross section of the contact probe in the fourth embodiment of the present application.

As shown in FIG. 12, in some embodiments of the present application, the shape of the cross section of the part of the tubular structure 100 abutting against the elastic member 200 is a quasi-hexagon, which includes at least two straight lines which are arranged at intervals, and the contact surfaces 300 are located on the two straight lines of the at least two straight lines. In the present embodiment, the cross section of the part of the tubular structure 100 abutting against the elastic member 200 is a quasi-hexagon, which has at least two straight lines, and at least two straight lines are included in six sides of the quasi-hexagon, and the two straight lines are arranged at intervals, and the contact surfaces 300 of the tubular structure 100 with the elastic member 200 are located on the two straight lines arranged at intervals.

Figure 13:
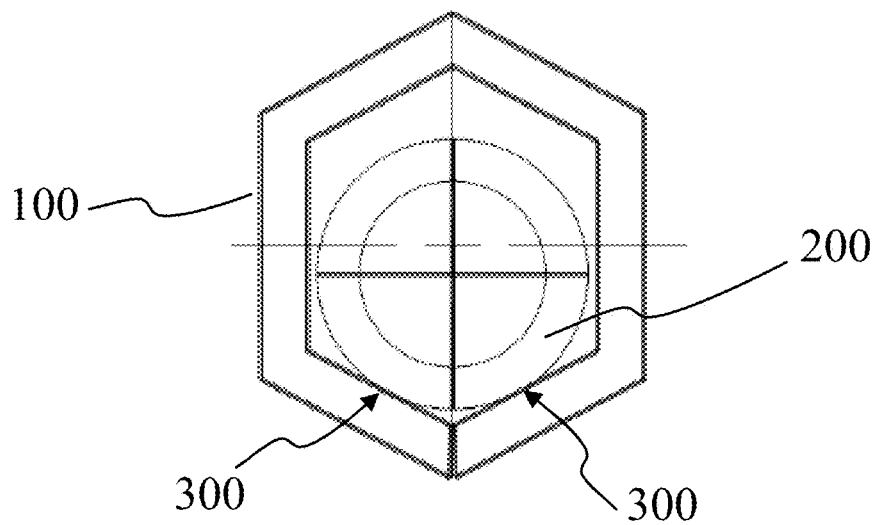
FIG. 13 is a schematic structural diagram of the cross section of the contact probe in the fifth embodiment of the present application.
Figure 14:
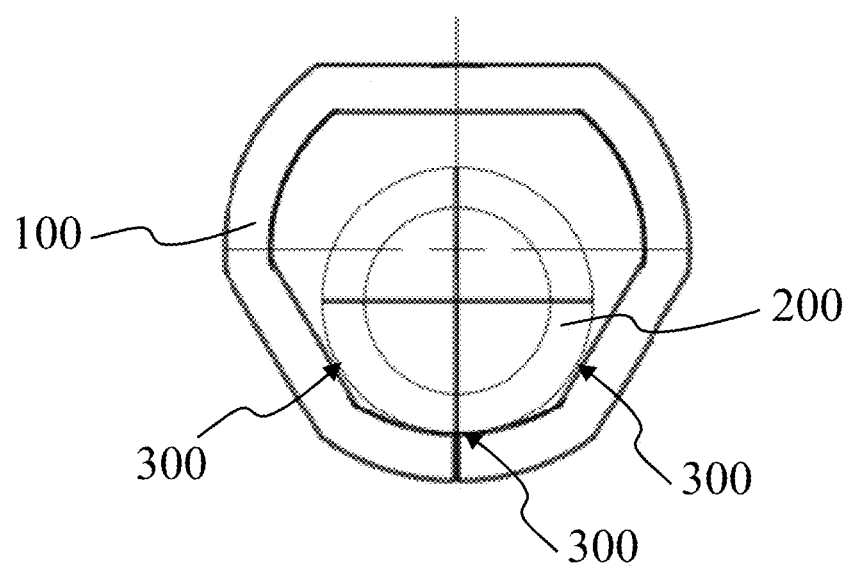
FIG. 14 is a schematic structural diagram of the cross section of the contact probe in the sixth embodiment of the present application.

As shown in FIG. 13, in some embodiments of the present application, the shape of the cross section of the part of the tubular structure 100 abutting against the elastic member 200 is substantially a regular hexagon, and the contact surfaces 300 are located on any two adjacent sides of the regular hexagon. In the present embodiment, the shape of the cross section of the part of the tubular structure 100 abutting against the elastic member 200 is a regular hexagon, and the lengths of six sides are the same. In the present embodiment, the contact surfaces 300 of the tubular structure 100 with the elastic member 200 are located on any two adjacent sides of the regular hexagon.

In some embodiments of the present application, the number of contact surfaces 300 is three. In the present embodiment, the contact surfaces 300 of the tubular structure 100 with the elastic member 200 can be three contact surfaces. After the first end of the elastic member 200 is engaged with the engagement part 110 of the tubular structure 100, the elastic member 200 abuts closely against the inner wall of the tubular structure 100, and the part of the elastic member 200 abutting against the tubular structure 100 has three contact surfaces 300. That is to say, there are four contact points between the elastic member 200 and the tubular structure 100, wherein the first end of the elastic member 200 is contacted with the engagement part 110, and the side wall of the elastic member 200 has three contact surfaces 300 with the inner wall of the tubular structure 100, thus forming a stable support with the four contact points. When using the contact probe, since the elastic member 200 has the stable contact surfaces 300 with the tubular structure 100, the elastic member 200, when it is bent, can always contact with at least three contact surfaces 300 of the tubular structure 100, thereby improving the stability of the structures within the contact probe and improving the reliability of electrical testing.

In some embodiments of the present application, the shape of the cross section of the part of the tubular structure 100 abutting against the elastic member 200 is a quasi-hexagon, which includes one first arc and two first straight lines, one end of the first arc is connected to one of the first straight lines, the other end of the first arc is connected to the other one of the first straight lines, and the contact surfaces 300 are located on the first arc and the two first straight lines respectively. In the present embodiment, the shape of the cross section of the part of the tubular structure 100 abutting against the elastic member 200 is a quasi-hexagon, which includes six sides including one first arc and two first straight lines. The ends of the first arc are connected to one end of each of the two first straight lines respectively, and three contact surfaces 300 of the tubular structure 100 with the elastic member 200 are located on the first arc and the two first straight lines respectively.

In some embodiments of the present application, the quasi-hexagon further comprises two second arcs and one second straight line, one end of the second straight line is connected to one of the second arcs, the other end of the second straight line is connected to the other one of the second arcs, and the ends of the two second arcs away from the second straight line are connected to the first straight line respectively. In the present embodiment, six sides of the quasi-hexagon include two second arcs and one second straight line, wherein two ends of the second straight line are connected to the two second arcs respectively, and three contact surfaces 300 of the tubular structure 100 with the elastic member 200 are located on the two second arcs and the one first straight line respectively.

It should be noted that in this article, relational terms such as first and second are only used to distinguish one entity or operation from another entity or operation, and do not necessarily require or imply any actual relationship or order between these entities or operations. Moreover, the terms "comprising", "including" or any other variation thereof are intended to cover non-exclusive inclusion, so that a process, method, item or device including a series of elements includes not only those elements, but also other elements not explicitly listed or elements inherent to such process, method, item or device. Without further restrictions, an element defined by the phrase "comprising one" does not exclude the existence of other identical elements in the process, method, item or device including the element.

Each embodiment in this description is described in a related manner, and the same and similar parts among these embodiments can be referred to each other, and each embodiment focuses on the differences from other embodiments.

The above are only the preferred embodiments of the present application, and is not intended to limit the protection scope of the present application. Any modification, equivalent replacements, improvement, etc. made within the spirit and principles of the present application are included in the protection scope of the present application.

What is claimed is:

1. A contact probe comprising:
   a tubular structure (100), within which an elastic member (200) is received;
   an engagement part (110) arranged within the tubular structure (100);
   a pushing part (120) arranged within the tubular structure (100) and arranged at an inner wall of the tubular structure (100) opposite to the engagement part (110);
   the elastic member (200), a part of the elastic member (200) is arranged within the tubular structure (100), a side surface at a first end of the elastic member (200) is engaged with the engagement part (110), and the pushing part (120) presses a side surface of the elastic member facing the pushing part, and both the engagement part (110) and the pushing part (120) press the elastic member (200) to make the elastic member (200) in a bent state, and make the part of the elastic member (200) within the tubular structure (100) to abut closely against the inner wall of the tubular structure (100).

2. The contact probe according to claim 1, wherein the elastic member (200) comprises tight coil parts (220) at two ends thereof and a loose coil part (210) arranged between the tight coil parts (220);
the engagement part (110) is engaged with the tight coil part (220) at the first end of the elastic member (200), and a tight coil part of the tight coil parts (220) at a second end of the elastic member protrudes out of the tubular structure (100);
when the elastic member (200) is not compressed, the loose coil part (210) abuts against the inner wall of the tubular structure (100), and when the elastic member (200) is compressed, a part of the tight coil part (220) protruding out of the tubular structure (100) abuts closely against the inner wall of the tubular structure (100).

3. The contact probe according to claim 2, wherein the engagement part (110) is clamped into a coil of the tight coil part (220), and the pushing part (130) presses a side surface of the tight coil part (220) facing the pushing part to make the elastic member (200) in a bent state.

4. The contact probe according to claim 1, wherein the engagement part (110) and the pushing part (120) are integrally formed with the tubular structure (100).

5. The contact probe according to claim 4, wherein a tube wall of the tubular structure (100) is provided with a first cutting groove (111), and a part of the tube wall of the tubular structure (100) extends into a receiving cavity along the first cutting groove (111) to form the engagement part.

6. The contact probe according to claim 4, wherein a tube wall of the tubular structure (100) is provided with a second cutting groove (121), and a part of the tube wall of the tubular structure (100) extends into a receiving cavity along the second cutting groove (121) to form the pushing part (120).

7. The contact probe according to claim 1, wherein the contact probe further comprises a blocking part (130), which is arranged within a receiving cavity and fixedly connected to the tubular structure (100), and an end face at the first end of the elastic member (200) abuts against the blocking part (130).

8. The contact probe according to claim 7, wherein the blocking part (130) is integrally formed with the tubular structure (100).

9. The contact probe according to claim 8, wherein a tube wall of the tubular structure (100) is provided with a third cutting groove (131), and a part of the tube wall of the tubular structure (100) extends into the receiving cavity along the third cutting groove (131) to form the blocking part (130).

10. The contact probe according to claim 1, wherein an outer wall of the tubular structure (100) is provided with at least one protrusion (140).

* * * * *